(12) United States Patent
Wang et al.

(10) Patent No.: US 12,529,865 B2
(45) Date of Patent: Jan. 20, 2026

(54) LENS MODULE AND METHOD FOR ASSEMBLING SAME

(71) Applicant: JIANGXI LIANCHUANG ELECTRONIC CO., LTD., NanChang (CN)

(72) Inventors: Zhuo Wang, NanChang (CN); Xinyu Xiong, NanChang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 351 days.

(21) Appl. No.: 18/252,946

(22) PCT Filed: Nov. 16, 2021

(86) PCT No.: PCT/CN2021/130945
§ 371 (c)(1),
(2) Date: May 15, 2023

(87) PCT Pub. No.: WO2022/111336
PCT Pub. Date: Jun. 2, 2022

(65) Prior Publication Data
US 2023/0418021 A1    Dec. 28, 2023

(30) Foreign Application Priority Data
Nov. 30, 2020   (CN) .......................... 202011370521.8

(51) Int. Cl.
*G02B 7/02*       (2021.01)
(52) U.S. Cl.
CPC .............. *G02B 7/025* (2013.01); *G02B 7/021* (2013.01)

(58) Field of Classification Search
CPC ........ G02B 7/025; G02B 7/021; G02B 7/028; H04N 23/55
See application file for complete search history.

(56) References Cited

U.S. PATENT DOCUMENTS

2019/0381952 A1*  12/2019  Wang ..................... G02B 7/02

FOREIGN PATENT DOCUMENTS

| CN | 204731515 U | 10/2015 |
| CN | 111133744 A | 5/2020 |
| CN | 112630922 A | 4/2021 |

OTHER PUBLICATIONS

International Search Report dated Jan. 30, 2022 from PCT Application No. PCT/CN2021/130945.

* cited by examiner

*Primary Examiner* — James C. Jones
(74) *Attorney, Agent, or Firm* — INNOVATION CAPITAL LAW GROUP, LLP; Vic Lin

(57) ABSTRACT

The present invention provides a lens module and a method for assembling the lens module. The lens module comprises: a base; a PCB, which is disposed on the base; a lens unit, which comprises one or more lenses and is disposed on the base; a first bonding layer, which is disposed between the base and the PCB to bond the base and the PCB together; and a second bonding layer, which is disposed between the base and the lens unit to bond the base and the lens unit together.

10 Claims, 12 Drawing Sheets

LENS MODULE AND METHOD FOR ASSEMBLING SAME

TECHNICAL FIELD

The disclosure generally relates to the technical field of photoelectricity, and in particular, to a lens module and a method for assembling the same.

BACKGROUND

In the technical field of lens, after pixels are upgraded to 8 MP (mega pixels), the size of a pixel is down to 2.1 μm or even smaller, such that the DOF (Depth of Focus) of the entire system is only a few micrometers. In a lens module system, an AA glue is used between a lens and a lens holder or a substrate for fixation and AA focusing. The thickness of the AA glue itself is at least 200 μm or even greater. For a common UV+ heat curing glue, such as OB787 and 786 of Delo, after the UV pre-curing, the glue needs to be further baked for heat curing, after which the glue will further shrink. The amount of shrinkage does have an average value for reference, but it is not fixed and has a distribution. By way of example, for a common glue thickness of 450 μm, the average value of the amount of shrinkage can be measured experimentally, which may be around 8 μm depending on the glue, but the variance thereof may be 1 μm or even greater. Assuming a variance of 1 μm, there would be a probability of 97% that the shrinkage range is 8 μm+/−2 μm. However, such a range of +/−2 μm enables the back focus variation of the same batch of modules to reach 4 μm or even greater.

On the other hand, after a reliability test is performed on a camera module, a thickness change of a glue may occur due to the shrinkage or swelling of the glue itself. In a wet working environment, the glue itself may absorb water vapor continuously, and then swell after absorbing moisture. Theoretically, the glue may dehydrate gradually and then shrink in a dry environment. However, the shrinkage time may be long and difficult to be controlled, thus affecting the imaging effect of the lens module. The thickness change after the reliability test is uncontrollable and difficult to be predicted, thereby affecting the resolution and imaging quality of the lens module.

The industry uses the result of a reliability test as a reference for accelerated aging, to predict the approximate imaging situation of a camera after it is used in real scenes for five years, for example. A glue, as an organic substance, may have a different thickness from the factory thickness after undergoing various extreme test environments such as cold and hot impact, and high temperature and high humidity. This thickness change, even by one or two microns, would have a serious impact on the imaging quality of the camera, but the unpredictability of this impact makes it impossible to compensate in advance.

The contents in the Background are only technologies known by the inventors, and do not necessarily represent the existing technology in the field.

SUMMARY

In view of at least one of defects in the existing technology, the present disclosure provides a lens module, including: a base; a PCB disposed on the base; a lens unit including one or more lenses and disposed on the base; a first bonding layer disposed between the base and the PCB to bond the base and the PCB together; and a second bonding layer disposed between the base and the lens unit to bond the base and the lens unit together.

According to an aspect of the present disclosure, the lens module further includes an image sensor disposed on the PCB, wherein the first bonding layer and the second bonding layer have substantially the same thickness and are made of the same material, such that a distance between the image sensor and an optical center of the lens unit remains substantially unchanged in a case where the first bonding layer and the second bonding layer swell or shrink.

According to an aspect of the present disclosure, the base includes a substrate, the first bonding layer is disposed between the substrate and the PCB, and the second bonding layer is disposed between the lens unit and the substrate.

According to an aspect of the present disclosure, the base includes a substrate and a lens holder fixed on the substrate for mounting the lens unit, the first bonding layer is disposed between the substrate and the PCB, and the second bonding layer is disposed between the lens unit and the lens holder, wherein the lens holder and the substrate are integrated.

According to an aspect of the present disclosure, the lens unit has a flange structure located on an outer periphery thereof, and the second bonding layer is disposed between the flange structure and the lens holder.

According to an aspect of the present disclosure, materials of the first bonding layer and the second bonding layer are selected from a group consisting of a UV adhesive, a thermosetting adhesive, an epoxy resin adhesive, a pressure-sensitive adhesive, a moisture curing adhesive and a light curing adhesive.

According to an aspect of the present disclosure, the lens module further includes a heat-dissipating hot slurry located between the base and the PCB.

The present disclosure further relates to a lens module, including:
  a substrate;
  a lens holder fixed on the substrate;
  a PCB disposed on the substrate;
  a lens unit including one or more lenses;
  a first bonding layer disposed between the lens holder and the substrate or between the lens holder and the PCB; and
  a second bonding layer disposed between the lens unit and the lens holder.

According to an aspect of the present disclosure, the lens unit has a flange structure located on an outer periphery thereof, and the second bonding layer is disposed between the flange structure and the lens holder.

According to an aspect of the present disclosure, the lens module further includes an image sensor disposed on the PCB, wherein the first bonding layer and the second bonding layer have substantially the same thickness and are made of the same material, such that a distance between the image sensor and an optical center of the lens unit remains substantially unchanged in a case where the first bonding layer and the second bonding layer swell or shrink.

The present disclosure further relates to a lens module, including:
  a substrate;
  a PCB disposed on the substrate;
  a lens holder fixed on the PCB or the substrate;
  a lens unit including one or more lenses;
  a connector through which the lens unit is connected to the lens holder;
  a first bonding layer disposed between the lens holder and a first end of the connector; and a second bonding layer disposed between the lens unit and a second end of the connector.

According to an aspect of the present disclosure, the lens module further includes an image sensor disposed on the PCB, wherein the first bonding layer and the second bonding layer have substantially the same thickness and are made of the same material, such that a distance between the image sensor and an optical center of the lens unit remains substantially unchanged in a case where the first bonding layer and the second bonding layer swell or shrink.

According to an aspect of the present disclosure, the connector is a lens cap having a first annular portion forming the first end, a second annular portion forming the second end, and a wall portion connecting the first annular portion and the second annular portion, the first annular portion located above the lens holder and bonded to the lens holder by the first bonding layer, and the second annular portion located above the lens unit and bonded to the lens unit by the second bonding layer, wherein the lens holder and the substrate are integrally processable.

According to an aspect of the present disclosure, the connector is a lens cap having a first annular portion forming the first end, a second annular portion forming the second end, and a wall portion connecting the first annular portion and the second annular portion; the lens unit has a flange structure located on an outer periphery thereof; the first annular portion is located above the lens holder and is bonded to the lens holder by the first bonding layer, and the second annular portion is located above the flange structure and is bonded to the flange structure by the second bonding layer, wherein the lens holder and the substrate are integrally processable.

According to an aspect of the present disclosure, the connector is an annular member that is a flat member with a hollowed central portion, an outer periphery of an upper surface or a lower surface of the annular member forming the first end, and an inner periphery of the upper surface or the lower surface of the annular member forming the second end; the lens unit has a flange structure located on an outer periphery thereof, the first bonding layer bonds the first end of the annular member and the lens holder together, and the second bonding layer bonds the flange structure and the second end of the annular member together, wherein the lens holder and the substrate are integrated.

The present disclosure further relates to a method for assembling a lens module, including:
electrically connecting an image sensor to a PCB;
fixing the PCB onto a base by a first bonding layer; and
fixing a lens unit onto the base by a second bonding layer, wherein the first bonding layer and the second bonding layer have the same thickness and are made of the same material, such that a distance between the image sensor and an optical center of the lens unit remains substantially unchanged in a case where the first bonding layer and the second bonding layer swell or shrink.

The present disclosure further relates to a method for assembling a lens module, including:
electrically connecting an image sensor to a PCB;
fixing the PCB onto a substrate;
fixing a lens unit onto a lens holder by a second bonding layer; and
fixing the lens holder onto the PCB or the substrate by a first bonding layer, wherein the first bonding layer and the second bonding layer have the same thickness and are made of the same material, such that a distance between the image sensor and an optical center of the lens unit remains substantially unchanged in a case where the first bonding layer and the second bonding layer swell or shrink.

The present disclosure further relates to a method for assembling a lens module, including:
electrically connecting an image sensor to an PCB;
fixing the PCB onto a substrate;
bonding a lens unit and a second end of a connector together by a second bonding layer;
fixing a lens holder onto the PCB or the substrate; and
bonding the lens holder and a first end of the connector together by a first bonding layer, wherein the first bonding layer and the second bonding layer have the same thickness and are made of the same material, such that a distance between the image sensor and an optical center of the lens unit remains substantially unchanged in a case where the first bonding layer and the second bonding layer swell or shrink.

In embodiments of the present disclosure, by means of a lens module and a method for assembling the same, inside which bonding layers with the same thickness and the same material are disposed at two corresponding positions, the offset amounts caused by the bonding layers at the two positions cancel each other due to synchronous variations thereof, and in particular, degradation of the imaging quality due to offset of a plane, in which an ideal imaging plane and an image sensor is located, caused by changes of the bonding layers themselves is counteracted, the imaging effect of the lens module is not affected, and the resolution and imaging quality of the lens module are improved.

BRIEF DESCRIPTION OF THE DRAWINGS

The drawings are used to provide a further understanding of the present disclosure and constitute a part of the specification, and are used to explain the present disclosure along with the embodiments of the present disclosure, but do not constitute any limitation to the disclosure. In the drawings.

DETAILED DESCRIPTION

Figure 1:
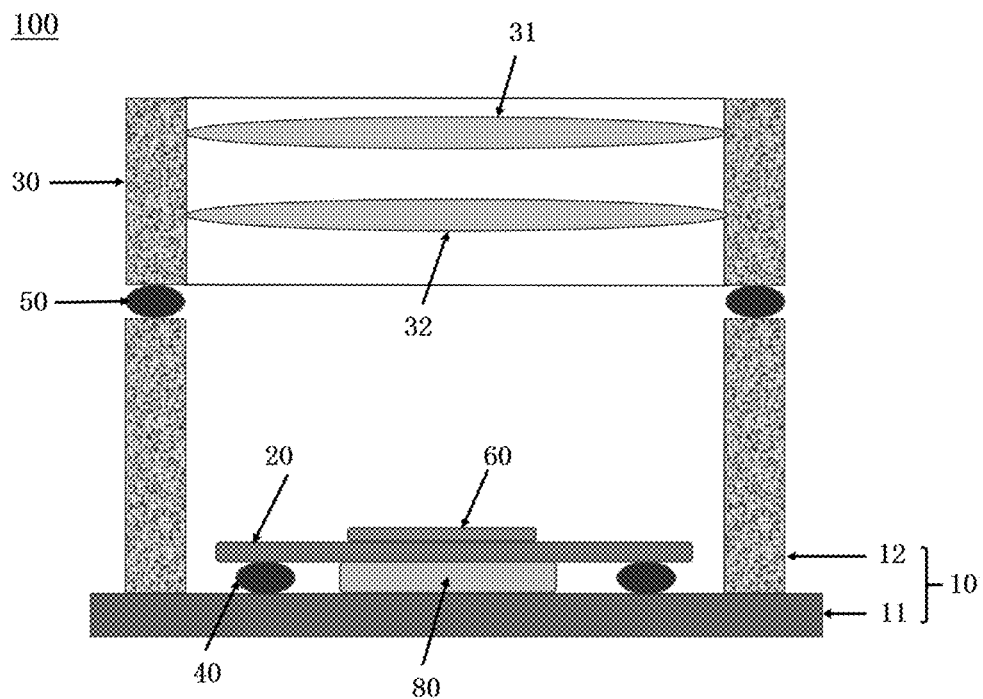
FIG. 1 illustrates a schematic view of a lens module according to an embodiment of the present disclosure.

Only certain exemplary embodiments will be briefly described below. As those skilled in the art will recognize, the described embodiments may be modified in various different ways without departing from the spirit or scope of the present disclosure. Therefore, the drawings and the following description are deemed essentially exemplary, and not limitative.

In the description of the present disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of the present disclosure and simplification of the description, instead of indicating or suggesting that the denoted devices or elements must be oriented specifically, or configured or operated in a specific orientation. Thus, such terms should not be construed to limit the present disclosure. In addition, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of the present disclosure, "plurality" means two or more, unless otherwise defined explicitly and specifically.

In the description of the present disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature therebetween, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

The preferred embodiments of the present disclosure will be described below with reference to the drawings. It should be appreciated that the preferred embodiments described herein are only used to illustrate and explain the present disclosure, but not to limit the present disclosure.

In order to solve the problem in the existing technology that the swelling or shrinkage of the glue in a lens module affects the resolution and imaging quality of the lens module, the inventors of the present application conceive that bonding layers are disposed at two designated positions in the lens module, and the characteristic that the bonding layers vary uniformly (i.e., swell or shrink simultaneously) in the same environment is utilized, thereby solving the problem in the existing technology that the imaging effect of a module is affected due to the variation in the bonding layer, and improving the resolution and imaging quality of the lens module. Additionally, by means of setting the thicknesses of the bonding layers, the tolerance redundancy can be better ensured between components in the module. The detailed description will be given below with reference to the drawings.

Figure 2:
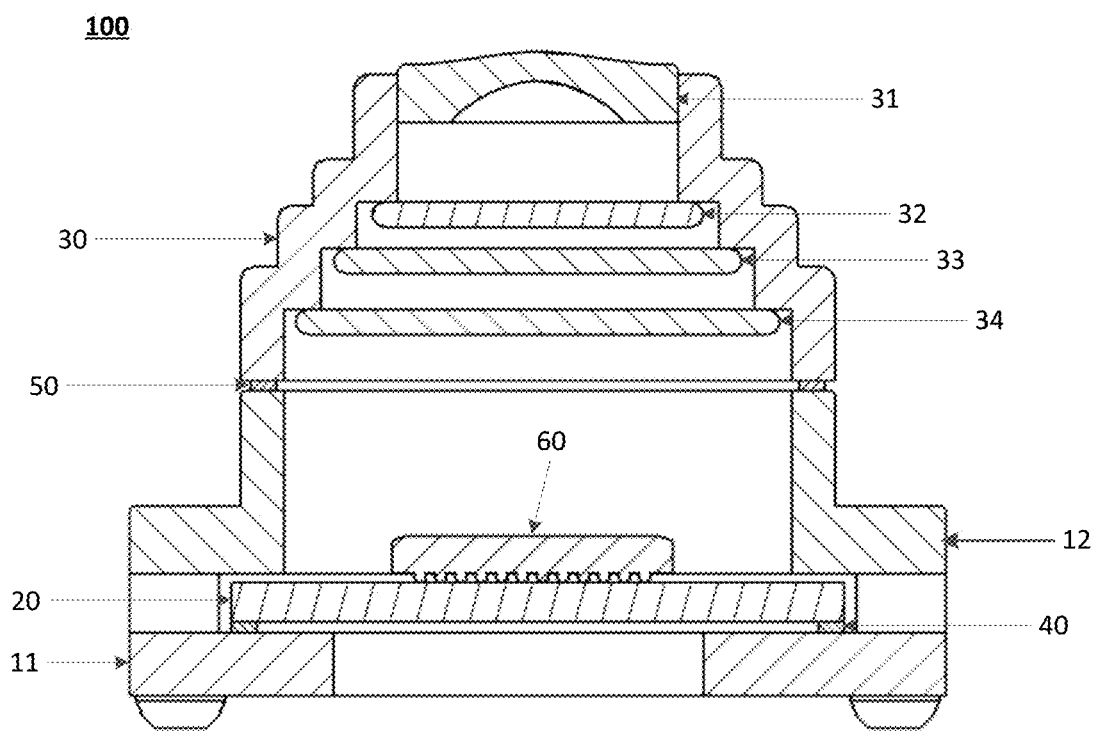
FIG. 2 illustrates a sectional view of a lens module according to an embodiment of the present disclosure.

FIG. 1 illustrates a schematic view of a lens module according to an embodiment of the present disclosure; and FIG. 2 illustrates a sectional view of a lens module according to an embodiment of the present disclosure. As shown in FIGS. 1 and 2, the lens module 100 includes: a base 10, a PCB 20, a lens unit 30, a first bonding layer and a second bonding layer 50. Herein, the PCB 20 is disposed on the base 10, and various circuits and chips required by the operation of the lens module 30 may be disposed on the PCB 20. The lens unit 30 is generally cylindrical and has an annular housing, and includes one or more lenses inside, such as a lens 31 and a lens 32 shown in FIG. 1 or lenses 31, 32, 33 and 34 shown in FIG. 2. The lens unit 30 is disposed on the base 10. In the embodiments of FIGS. 1 and 2, the base 10 includes a substrate 11 and a lens holder 12. The first bonding layer 40 is disposed between the base 10 and the PCB 20 (specifically, between the substrate 11 and the PCB 20), and distributed, for example, in an annular shape, to bond the base 10 and the PCB 20 together, and the second bonding layer 50 is disposed between the base 10 and the lens unit 30 (specifically, between an end portion of the lens holder 12 and an end portion of the lens unit 30, wherein the end portions of both are relatively close to each other), and distributed, for example, in an annular shape, to bond the base 10 and the lens unit 30 together. Alternatively, according to the processing and forming manner, the lens holder 12 and the substrate 11 may be processed integrally, so that both are integrated, and the base 10 including the substrate 11 and the lens holder 12 is obtained by means of integral processing.

According to an embodiment of the present disclosure, as shown in FIG. 1, the lens module 100 further includes an image sensor 60 disposed on the PCB 20. The image sensor 60 is located on a focal plane of the lens unit 30, so that the lens unit 30 can converge light beams from outside onto the image sensor 60 for imaging. The image sensor 60 is, for example, a CMOS image sensor or a CCD image sensor.

According to a preferred embodiment of the present disclosure, the first bonding layer 40 and the second bonding layer 50 are provided with substantially the same thickness (thicknesses having a difference within 20% may be considered to be substantially the same, or within 10%, or within 5% or 1%), and are made of the same material. Thus, when the first bonding layer 40 and the second bonding layer 50 swell or shrink, whether due to absorption or loss of water, or due to high or low temperature, in the same environmental conditions, they can swell or shrink synchronously, and the distances and directions of swelling or shrinkage are also the same, so that a distance between the image sensor 60 and an optical center of the lens unit 30 can remain substantially unchanged, that is, the image sensor 60 is always maintained in the focal plane of the lens unit 30. Therefore, the swelling or shrinkage does not affect the imaging effect of the lens module 100. For example, when in a humid environment, the first bonding layer 40 may swell due to moisture absorption, causing the image sensor 60 to move in an upward direction in the figure; meanwhile, the second bonding layer 50 also swells due to moisture absorption, causing the lens unit 30 to move in an upward direction in the figure, and the optical center also to move upwards; furthermore, since the materials and thicknesses of both are the same, their distances of moving upwards are approximately equal, and thus the distance between the optical center of the lens unit 30 and the image sensor 60 can remain substantially unchanged. In the present disclosure, if the distance between the optical center of the lens unit 30 and the image sensor 60 alters by less than 10%, it may be considered that the distance between both is substantially unchanged. Preferably, if the alteration is less than 5%, or more preferably less than 1%, it can be considered that the distance between both is substantially unchanged.

According to an embodiment of the present disclosure, materials of the first bonding layer 40 and the second bonding layer 50 are selected from a group consisting of a UV adhesive, a thermosetting adhesive, an epoxy resin adhesive, a pressure-sensitive adhesive, a moisture curing adhesive and a light curing adhesive. As shown in FIGS. 1 and 2, the PCB 20 and the base 10 are connected by the first bonding layer 40 made of a glue material. Because the glue material has a Shore hardness lower than that of a mechanical structural member (such as a screw), it may have a certain buffering effect. During the use of the lens module, the first bonding layer 40 may have small extrusion deformation to the PCB 20, and this protects the PCB 20 to a certain extent, and reduces the thermal stress applied to the PCB 20 in the case that the substrate 11 and the PCB 20 do not swell uniformly after the temperature changes, thereby further reducing its possible deformation. Theoretically, this deformation may directly affect the sensor 60, causing the imaging surface of the CMOS to warp, etc. The lens unit 30 and the base 10 are connected by the second bonding layer 50 made of a glue of the same material. Compared with a connector having a mechanical structure, the second bonding layer 50 also has a certain buffering and protecting effect on the lens unit 30 during use, which will not be repeated here. In addition, the thicknesses of the bonding layers may be regulated according to the assembly requirements of the lens module. For example, when the thicknesses of the bonding layers are set to be thicker, the tolerance redundancy can be better ensured between components in the lens module, and the offset amounts of the image sensor 60 and the lens unit 30 produced in the direction of the optical axis of the lens unit cancel each other due to the synchronous variations of the first bonding layer 40 and the second bonding layer 50, which can eliminate or alleviate the influence on the imaging effect.

Figure 3:
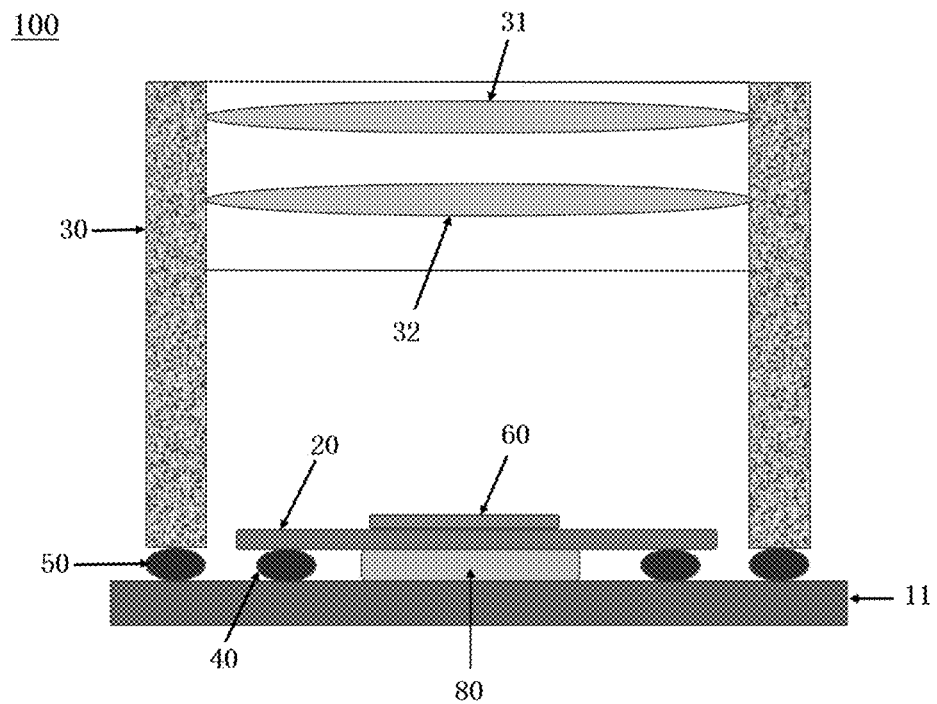
FIG. 3 illustrates a schematic view of a lens module according to an embodiment of the present disclosure.

FIG. 3 illustrates a schematic view of a lens module according to another embodiment of the present disclosure. As shown in the figure, the base 10 therein includes a substrate 11, but does not include the lens holder 12 in the embodiments of FIGS. 1 and 2. In the embodiment of FIG. 3, the first bonding layer 40 is disposed between the substrate 11 and the PCB 20, and the second bonding layer 50 is disposed between the lens unit 30 and the substrate 11, so as to cancel the offset amounts of the image sensor and the lens unit 30 produced in the direction of the optical axis of the lens unit due to the variations of the bonding layers. The working principle of the embodiment of FIG. 3 is substantially the same as those of the embodiments of FIGS. 1 and 2, which will not be repeated here.

Figure 4:
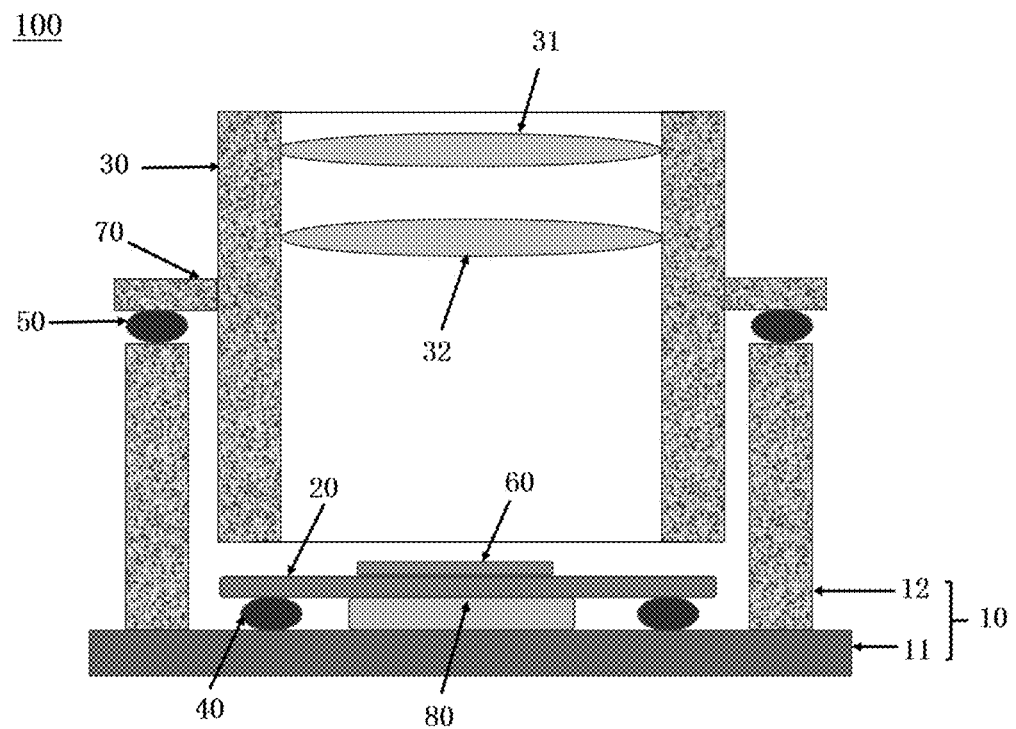
FIG. 4 illustrates a schematic view of a lens module according to an embodiment of the present disclosure.
Figure 5:
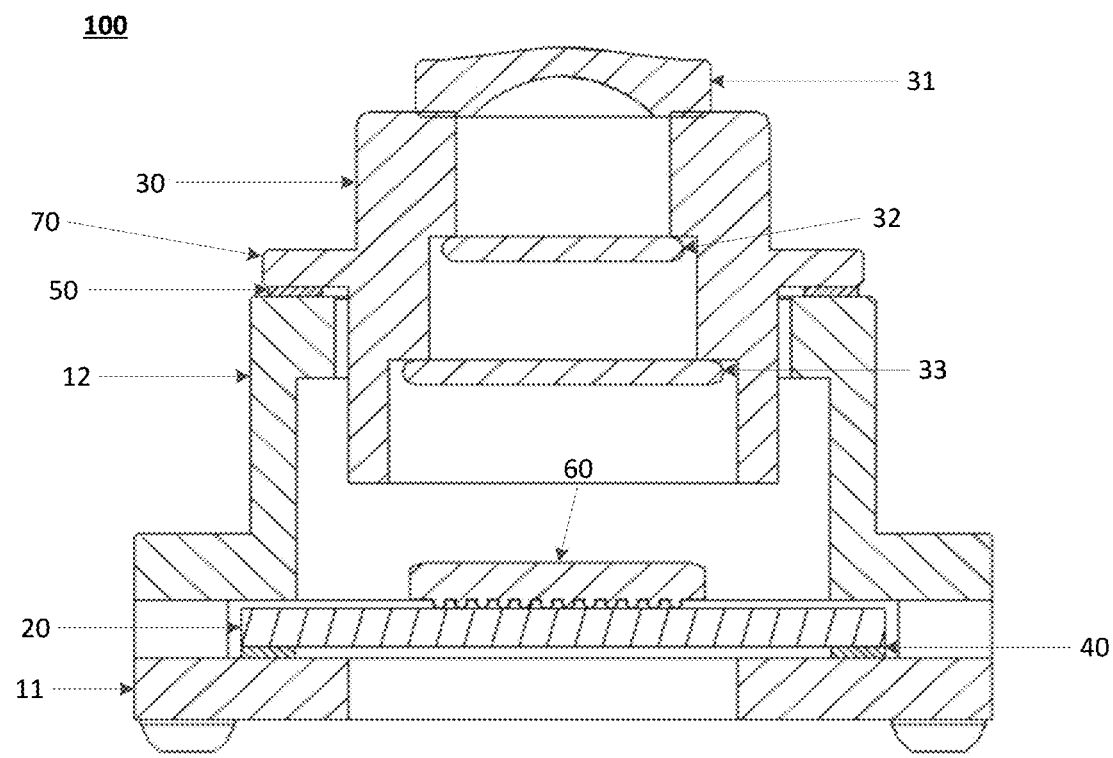
FIG. 5 illustrates a sectional view of a lens module according to an embodiment of the present disclosure.

FIG. 4 illustrates a schematic view of a lens module according to an embodiment of the present disclosure, and FIG. 5 illustrates a sectional view of a lens module according to an embodiment of the present disclosure. As shown in FIGS. 4 and 5, the base 10 therein includes a substrate 11 and a lens holder 12 fixed on the substrate 11 for mounting the lens unit 30. Alternatively, according to the processing and forming manner, the lens holder 12 and the substrate 11 may be processed integrally, so that both are integrated, and the base 10 including the substrate 11 and the lens holder 12 is obtained by means of integral processing. The first bonding layer 40 is disposed between the substrate 11 and the PCB 20, and the second bonding layer 50 is disposed between the lens unit 30 and the lens holder 12.

Different from the embodiments of FIGS. 1 and 2, as shown in FIG. 4, the lens unit 30 in the lens module 100 has a flange structure 70 located on an outer periphery thereof. The flange structure 70 is, for example, an annular plate-shaped member and is integrally formed with, or is fixed on, a housing of the lens unit 30. The flange structure is located above an upper end portion of the lens holder 12, and the second bonding layer 50 is disposed between the flange structure 70 and the upper end portion of the lens holder 12. Similarly, the first bonding layer 40 and the second bonding layer 50 are provided with substantially the same thickness and are made of the same material. Thus, when the first bonding layer 40 and the second bonding layer 50 swell or shrink, whether due to absorption or loss of water, or due to high or low temperature, in the same environmental conditions, they can swell or shrink synchronously, and the distances and directions of swelling or shrinkage are also the same, so that a distance between the image sensor 60 and an optical center of the lens unit 30 can remain substantially unchanged, that is, the image sensor 60 is always maintained in the focal plane of the lens unit 30. Therefore, the swelling or shrinkage does not affect the imaging effect of the lens module 100.

According to an embodiment of the present disclosure, as shown in FIGS. 1, 3 and 4, the lens module 100 further includes a heat-dissipating hot slurry 80 located between the base 10 and the PCB 20 for dissipating heat of the PCB 20.

Figure 6:
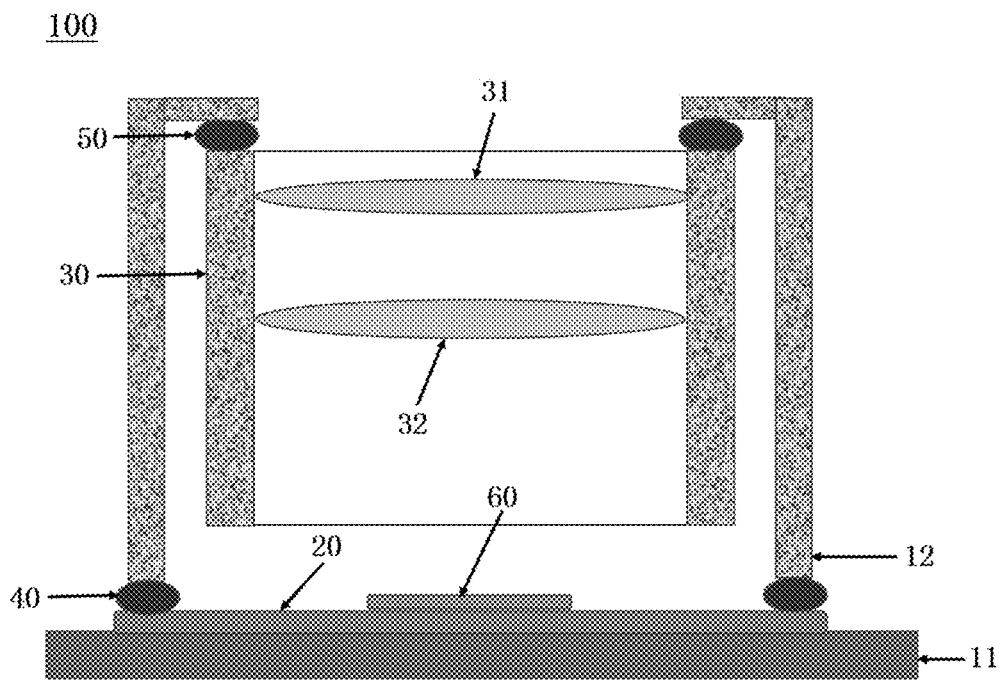
FIG. 6 illustrates a schematic view of a lens module according to an embodiment of the present disclosure.
Figure 7:
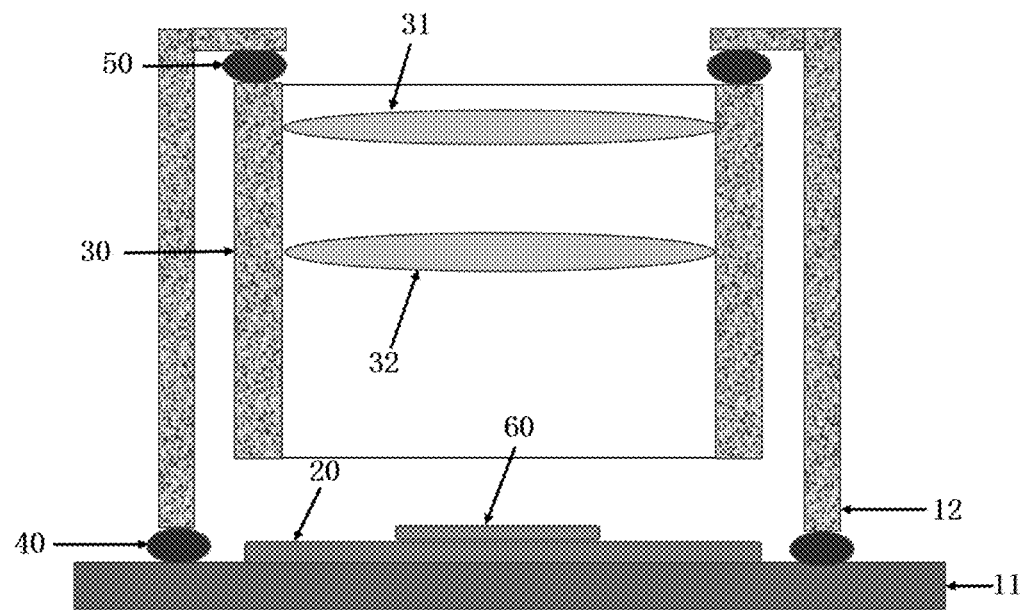
FIG. 7 illustrates a schematic view of a lens module according to an embodiment of the present disclosure.

FIG. 6 illustrates a schematic view of a lens module according to another embodiment of the present disclosure. As shown in FIG. 6, the lens module 100 includes a substrate 11, a lens holder 12, a PCB 20, a lens unit 30, a first bonding layer 40 and a second bonding layer 50. Herein, the lens holder 12 is fixed on the PCB 20 for mounting the lens unit 30, and the PCB 20 is disposed on the substrate 11. The lens unit 30 includes one or more lenses 31, 32, and the lens holder 12 is a hollowed cylinder with an L-shaped cross section. For example, the lens holder 12 has a vertical annular wall (forming a vertical portion of the L shape) and an inwardly extending annular portion (forming a horizontal portion of the L shape) at an upper portion or top end of the annular wall, wherein the annular portion is opposite to, and located outside, an end of the lens unit 30 away from the substrate 11. The PCB 20 is locked and fixed on the substrate 11, and the lens holder 12 is used for mounting the lens unit 30. It should be noted that, in this structure, the substrate 11 itself does not come into direct contact with the lens holder 12, in other words, the substrate 11 does not necessarily exist. In some designs, the substrate 11 may be absent. The first bonding layer 40 is disposed between the bottom of the annular wall of the lens holder 12 and the PCB 20, and the second bonding layer 50 is disposed between the end of the lens unit 30 away from the substrate 11 and the annular portion of the lens holder 12. FIG. 7 illustrates a schematic view of a lens module according to an embodiment of the present disclosure. As shown in FIG. 7, the lens module 100 includes a substrate 11, a lens holder 12, a PCB 20, a lens unit 30, a first bonding layer 40 and a second bonding layer 50. Herein, the lens holder 12 is fixed on the substrate 11 for mounting the lens unit 30, and the PCB is disposed on the substrate 11. The lens unit 30 includes one or more lenses 31, 32, and the lens holder 12 is a hollowed cylinder with an L-shaped cross section. For example, the lens holder 12 has a vertical annular wall (forming a vertical portion of the L shape) and an inwardly extending annular portion (forming a horizontal portion of the L shape) at an upper portion or top end of the annular wall, wherein the annular portion is opposite to, and located outside, an end of the lens unit 30 away from the substrate 11. The first bonding layer 40 is disposed between the bottom of the annular wall of the lens holder 12 and the substrate 11, and the second bonding layer 50 is disposed between the end of the lens unit 30 away from the substrate 11 and the annular portion of the lens holder 12.

Figure 8:
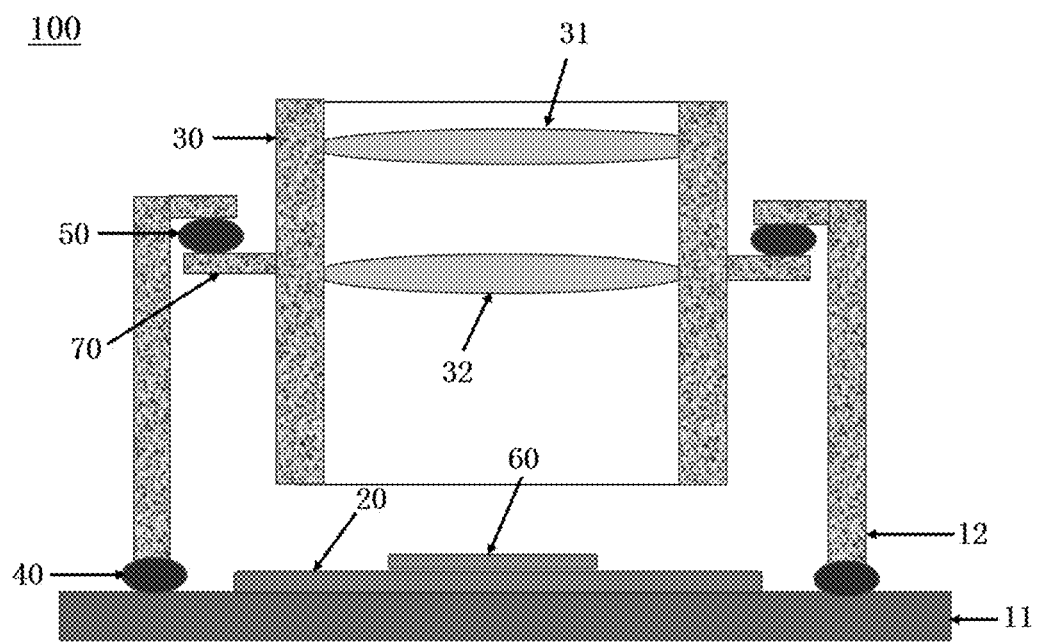
FIG. 8 illustrates a schematic view of a lens module according to an embodiment of the present disclosure.

FIG. 8 illustrates a schematic view of a lens module according to an embodiment of the present disclosure. As shown in FIG. 8, the lens module 100 includes a substrate 11, a lens holder 12, a PCB 20, a lens unit 30, a first bonding layer 40 and a second bonding layer 50. Herein, the lens holder 12 is fixed on the substrate 11 for mounting the lens unit 30, and the PCB is disposed on the substrate 11. The lens unit 30 includes one or more lenses 31, 32, and has a flange structure 70 located on an outer periphery thereof. The flange structure 70 is, for example, an annular plate-shaped member and is integrally formed with, or is fixed on, a housing of the lens unit 30. The lens holder 12 is a hollowed cylinder with an L-shaped cross section. For example, the lens holder 12 has a vertical annular wall (forming a vertical portion of the L shape) and an inwardly extending annular portion (forming a horizontal portion of the L shape) at an upper portion or top end of the annular wall, wherein the annular portion is opposite to, and located above, the flange structure 70. The first bonding layer 40 is disposed between the bottom of the annular wall of the lens holder 12 and the substrate 11, and the second bonding layer 50 is disposed between the flange structure 70 and the annular portion of the lens holder 12.

Figure 9:
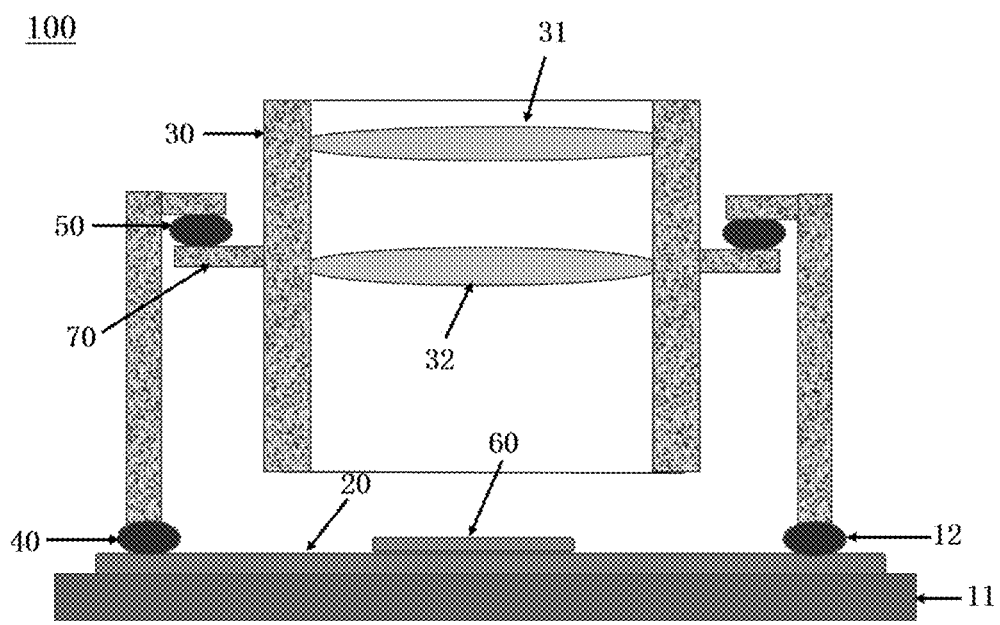
FIG. 9 illustrates a schematic view of a lens module according to an embodiment of the present disclosure.

FIG. 9 illustrates a schematic view of a lens module according to another embodiment of the present disclosure. As shown in FIG. 9, the lens module 100 includes a substrate 11, a lens holder 12, a PCB 20, a lens unit 30, a first bonding layer 40 and a second bonding layer 50. The lens holder 12 is fixed on the PCB 20 for mounting the lens unit 30, and the PCB 20 is disposed on the substrate 11. The lens unit 30 includes one or more lenses 31, 32, and further has a flange structure 70 located on an outer periphery thereof. The flange structure 70 is, for example, an annular plate-shaped member and is integrally formed with, or is fixed on, a housing of the lens unit 30. The lens holder 12 is a hollowed cylinder with an L-shaped cross section. For example, the lens holder 12 has a vertical annular wall (forming a vertical portion of the L shape) and an inwardly extending annular portion (forming a horizontal portion of the L shape) at an upper portion or top end of the annular wall. The annular portion is opposite to, and located above, the flange structure 70. The PCB 20 is locked and fixed on the substrate 11, and the lens holder 12 is used for mounting the lens unit 30. It should be noted that, in this structure, the substrate 11 itself does not come into direct contact with the lens holder 12, in other words, the substrate 11 here does not necessarily exist. In some designs, the substrate 11 may be absent. The first bonding layer 40 is disposed between the bottom of the annular wall of the lens holder 12 and the PCB 20, and the second bonding layer 50 is disposed between the lens unit 30 and the annular portion of the lens holder 12. Specifically, the second bonding layer 50 is disposed between the flange structure 70 and the annular portion of the lens holder 12. The working principles of the embodiments of FIGS. 6 to 9 are substantially the same as those of the embodiments of FIGS. 1 and 2, which will not be repeated here.

Figure 10:
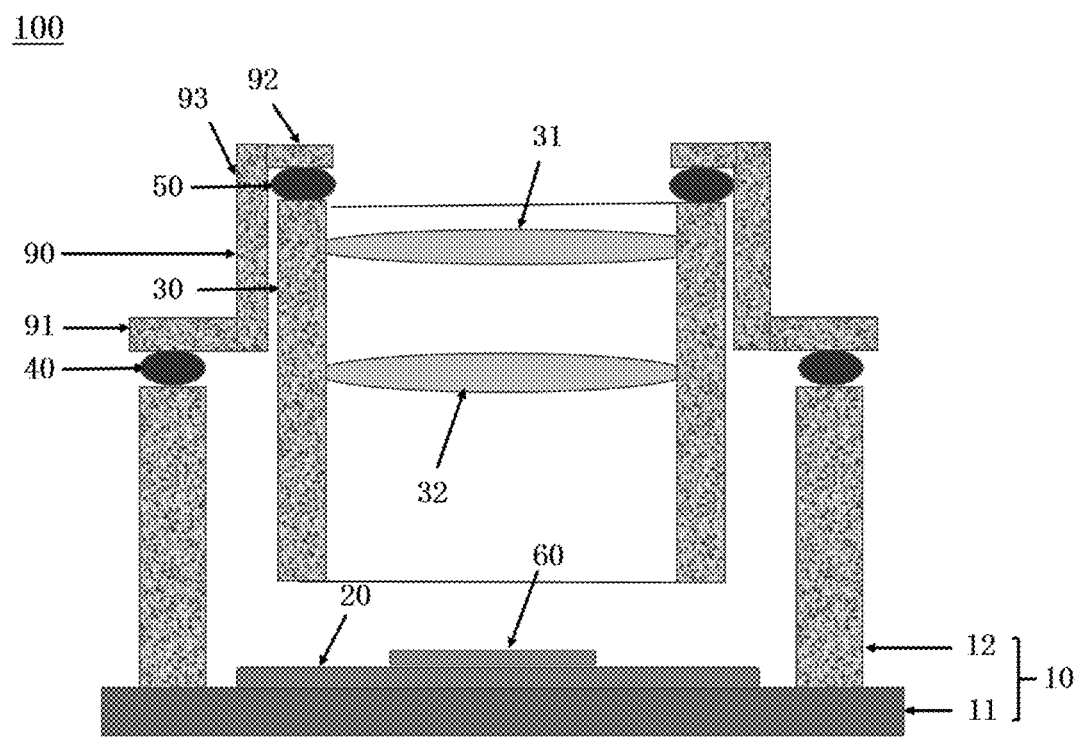
FIG. 10 illustrates a schematic view of a lens module according to an embodiment of the present disclosure.
Figure 11:
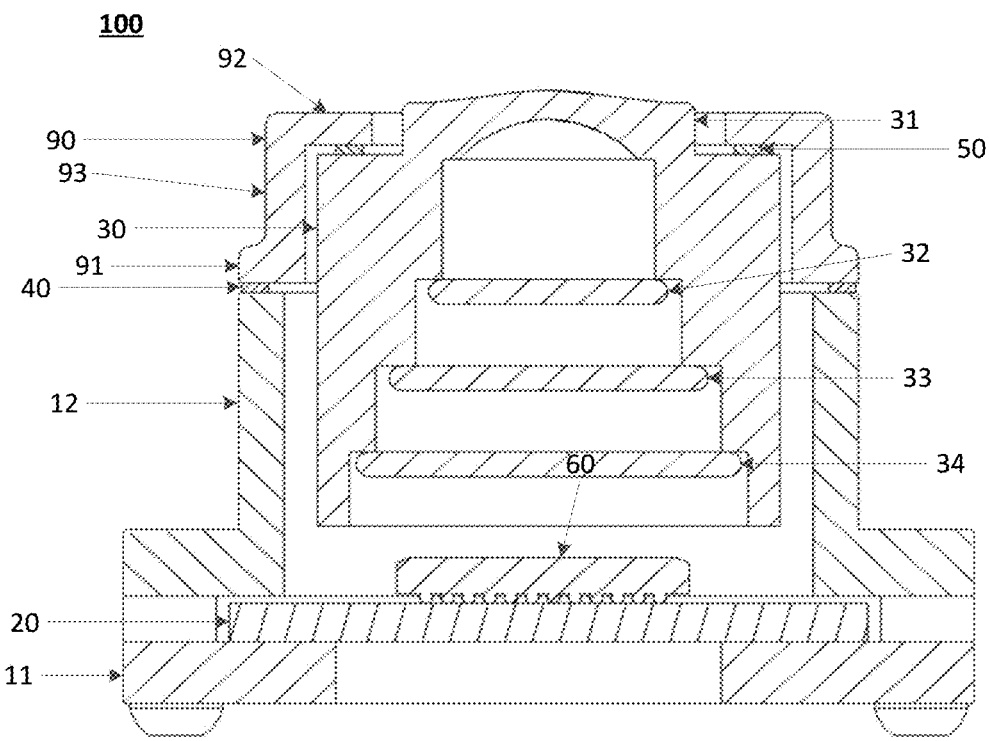
FIG. 11 illustrates a sectional view of a lens module according to an embodiment of the present disclosure.

FIG. 10 illustrated a schematic view of a lens module according to another embodiment of the present disclosure, and FIG. 11 illustrates a sectional view of a lens module according to an embodiment of the present disclosure. As shown in FIGS. 10 and 11, the lens module 100 includes a substrate 11, a lens holder 12, a PCB 20, a lens unit 30, a connector 90, a first bonding layer 40 and a second bonding layer 50. The substrate 11 and the lens holder 12 together form a base 10. Herein, the lens holder 12 is directly fixed on the substrate 11, and the PCB 20 is disposed on the substrate 11. Alternatively, according to the processing and forming manner, the lens holder 12 and the substrate 11 may be processed integrally, so that both are integrated, and the base 10 including the substrate 11 and the lens holder 12 is obtained by means of integral processing. The lens unit 30 includes one or more lenses, such as the lens 31, 32 shown in FIG. 10, or the lenses 31, 32, 33, 34 shown in FIG. 11. The lens unit 30 is connected to the lens holder 12 through the connector 90. The first bonding layer 40 is disposed between the lens holder 12 and a first end of the connector 90, and the second bonding layer 50 is disposed between the lens unit 30 and a second end of the connector 90.

Figure 12:
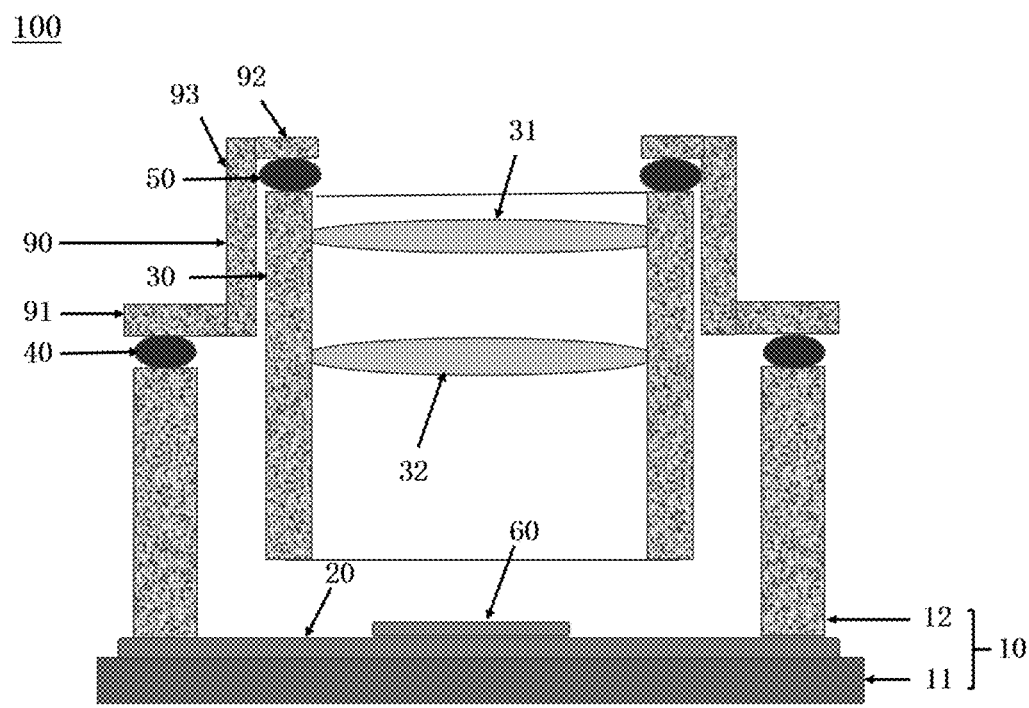
FIG. 12 illustrates a schematic view of a lens module according to an embodiment of the present disclosure.

FIG. 12 illustrates a schematic view of a lens module according to another embodiment of the present disclosure. The structure of the lens module in FIG. 12 is substantially the same as that of the lens module in FIG. 10, and the differences therebetween lie in: the lens holder 12 is directly fixed on the PCB 20, and the PCB 20 is disposed on the substrate 11.

According to an embodiment of the present disclosure, as shown in FIGS. 6-12, the lens module 100 further includes an image sensor 60 disposed on the PCB 20, wherein the first bonding layer 40 and the second bonding layer 50 are provided with substantially the same thickness and are made of the same material. When the first bonding layer 40 and the second bonding layer 50 swell or shrink in the same environmental conditions, they can swell or shrink synchronously, and the distances of swelling or shrinkage are also the same theoretically, so that a distance between the image sensor 60 and an optical center of the lens unit 30 can remain substantially unchanged, and the imaging effect of the lens module may not be affected.

According to an embodiment of the present disclosure, as shown in FIGS. 10, 11 and 12, the connector 90 is a lens cap having a first annular portion 91 forming a first end, a second annular portion 92 forming a second end, and a wall portion 93 connecting the first annular portion 91 and the second annular portion 92. The first annular portion 91 is located above the lens holder 12 and is bonded to the lens holder 12 by the first bonding layer 40, and the second annular portion 92 is located above the lens unit 30 and is bonded to the lens unit 30 by the second bonding layer 50.

Figure 13:
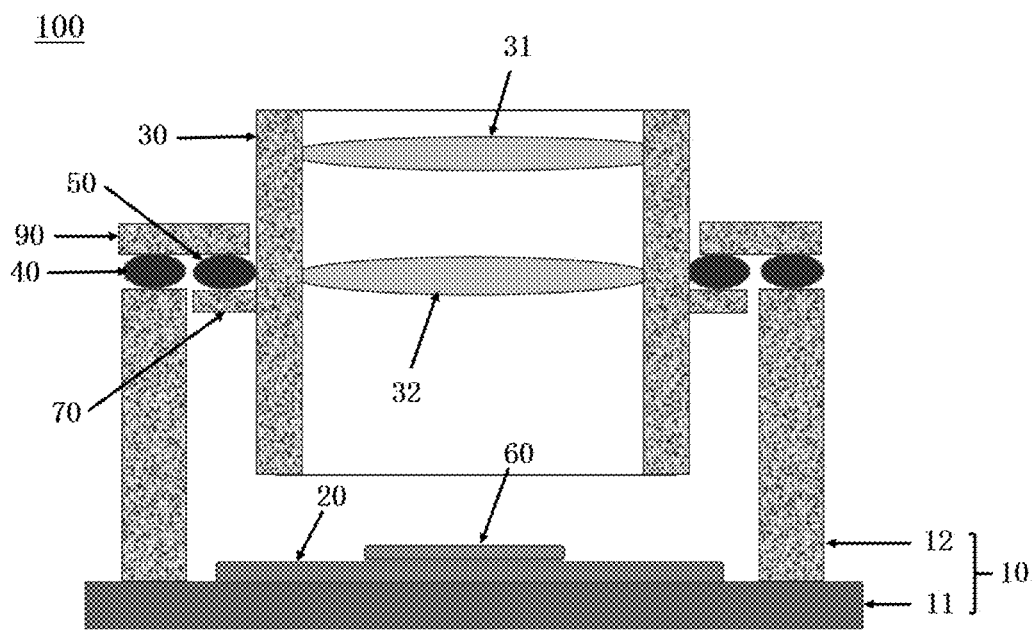
FIG. 13 illustrates a schematic view of a lens module according to an embodiment of the present disclosure.
Figure 14:
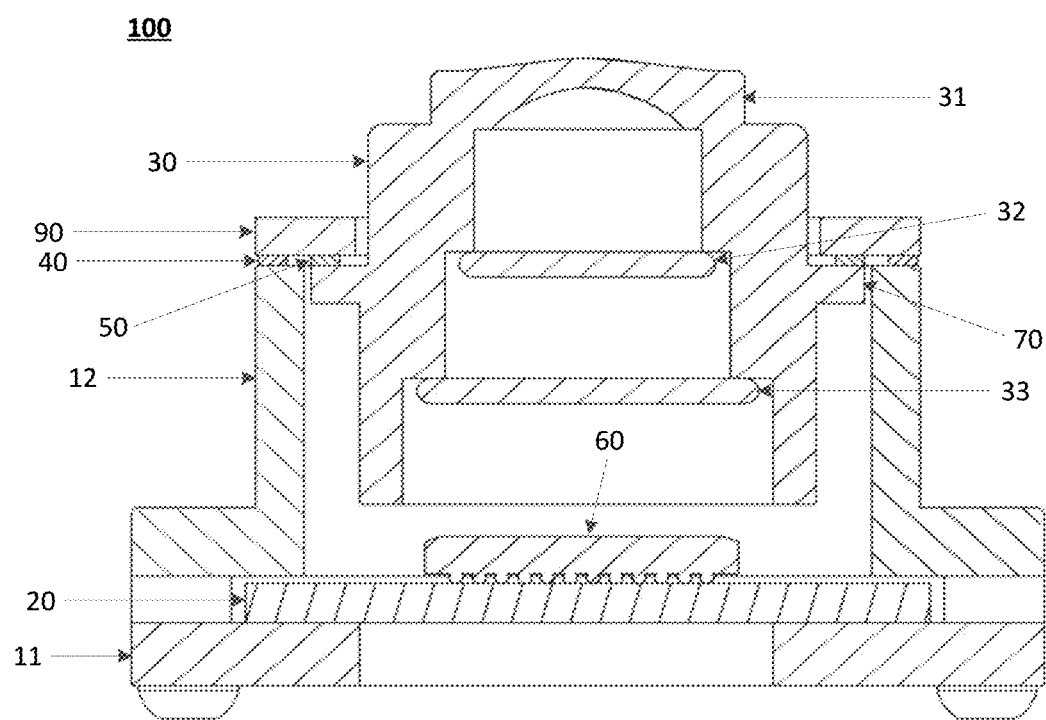
FIG. 14 illustrates a sectional view of a lens module according to an embodiment of the present disclosure.

FIG. 13 illustrates a schematic view of a lens module according to an embodiment of the present disclosure, and FIG. 14 illustrates a sectional view of a lens module according to an embodiment of the present disclosure. As shown in FIGS. 13 and 14, the connector 90 therein is an annular member that is a flat member with a hollowed central portion, an outer periphery of a lower surface of the annular member forming a first end, and an inner periphery of the lower surface of the annular member forming a second end. Alternatively, the annular member is a circular ring. The lens unit 30 has a flange structure 70 located on an outer periphery thereof. The connector 90 is located on an upper end of the lens holder 12 and above the flange structure 70. The first bonding layer 40 bonds the first end of the annular member and (the upper end of) the lens holder 12 together, and the second bonding layer 50 bonds the flange structure 70 and the second end of the annular member together.

Figure 15:
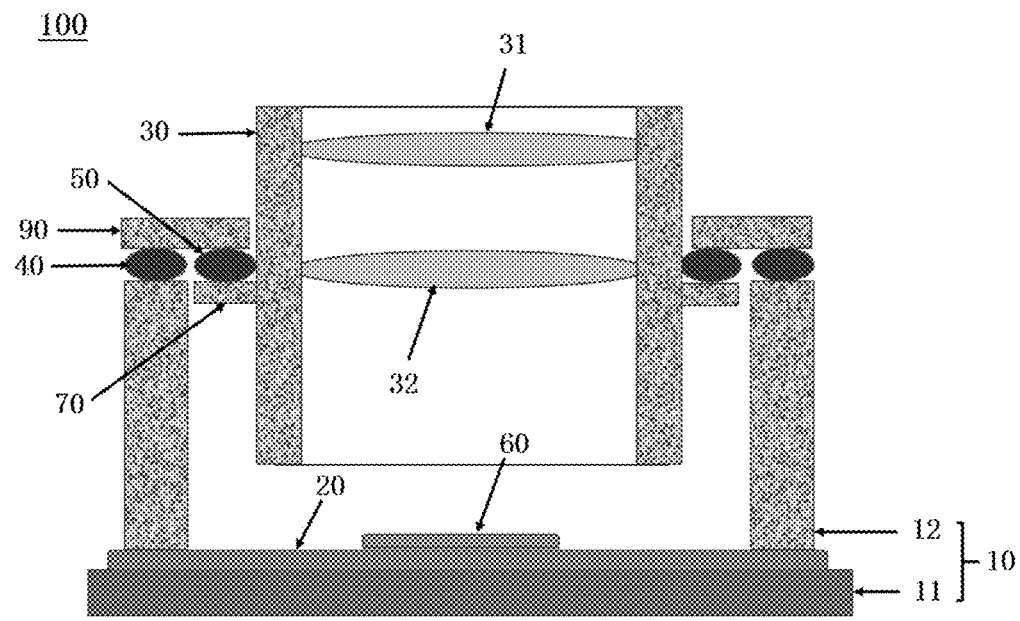
FIG. 15 illustrates a schematic view of a lens module according to an embodiment of the present disclosure.

FIG. 15 illustrates a schematic view of a lens module according to another embodiment of the present disclosure. The structure of the lens module in FIG. 15 is substantially the same as that of the lens module in FIG. 13, and the differences therebetween lie in: the lens holder 12 is directly fixed on the PCB 20, and the PCB 20 is disposed on the substrate 11.

Figure 16:
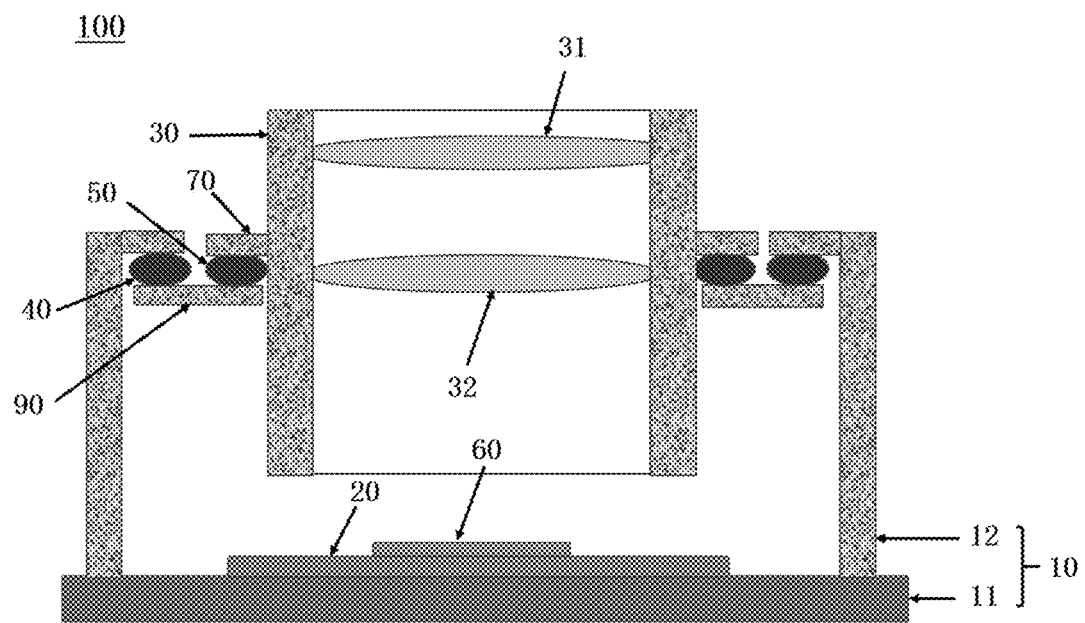
FIG. 16 illustrates a schematic view of a lens module according to an embodiment of the present disclosure.

FIG. 16 is a schematic view of a lens module according to another embodiment of the present disclosure. As shown in FIG. 16, similar to FIG. 13, the connector 90 therein is an annular member that is a flat member with a hollowed central portion, an outer periphery of an upper surface of the annular member forming a first end, and an inner periphery of the upper surface of the annular member forming a second end. Alternatively, the annular member is a circular ring. The lens unit 30 has a flange structure 70 located on an outer periphery thereof. The flange structure 70 is, for example, an annular plate-shaped member and is integrally formed with, or is fixed on, a housing of the lens unit 30. The lens holder 12 is a hollowed cylinder with an L-shaped cross section. For example, the lens holder 12 has a vertical annular wall (forming a vertical portion of the L shape) and an inwardly extending annular portion (forming a horizontal portion of the L shape) at an upper portion or top end of the annular wall, the annular portion being opposite to the flange structure 70. The connector 90 is located inside the lens holder 12, and specifically located below the annular portion of the lens holder 12 and the flange structure 70. The first bonding layer 40 bonds the first end of the annular member (the connector 90) and the annular portion of the lens holder 12 together, and the second bonding layer 50 bonds the second end of the annular member (the connector 90) and the flange structure 70 together. The bottom of the annular wall of the lens holder 12 is fixed on the substrate 11.

Figure 17:
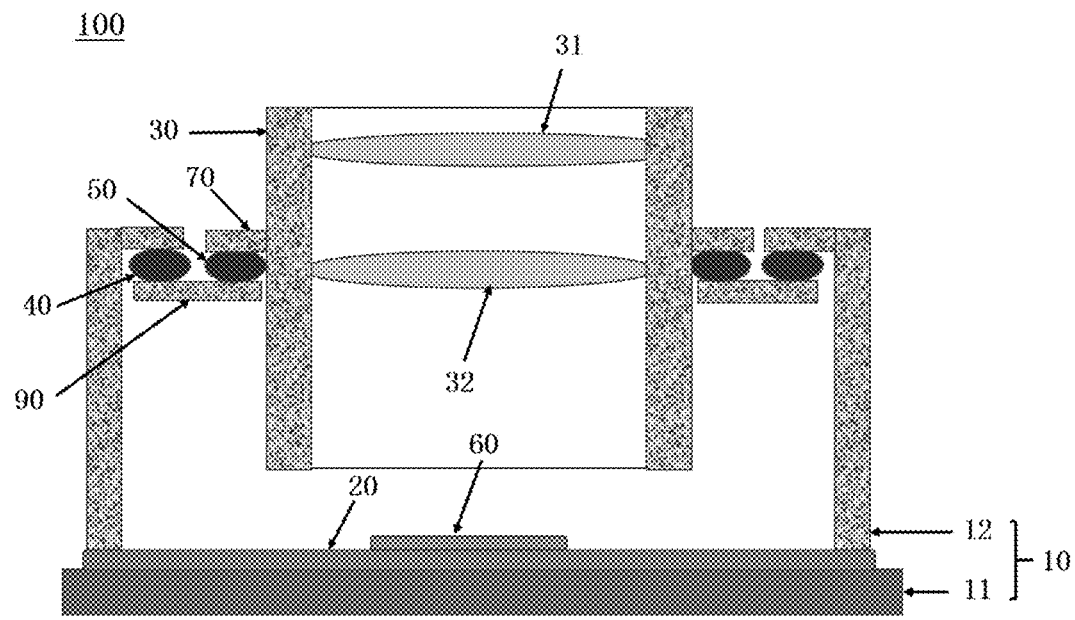
FIG. 17 illustrates a schematic view of a lens module according to an embodiment of the present disclosure.

FIG. 17 is a schematic view of a lens module according to another embodiment of the present disclosure. The structure of the lens module in FIG. 17 is substantially the same as that of the lens module in FIG. 16, and the differences therebetween lie in: the lens holder 12 is directly fixed on the PCB 20, and the PCB 20 is disposed on the substrate 11.

Figure 18:
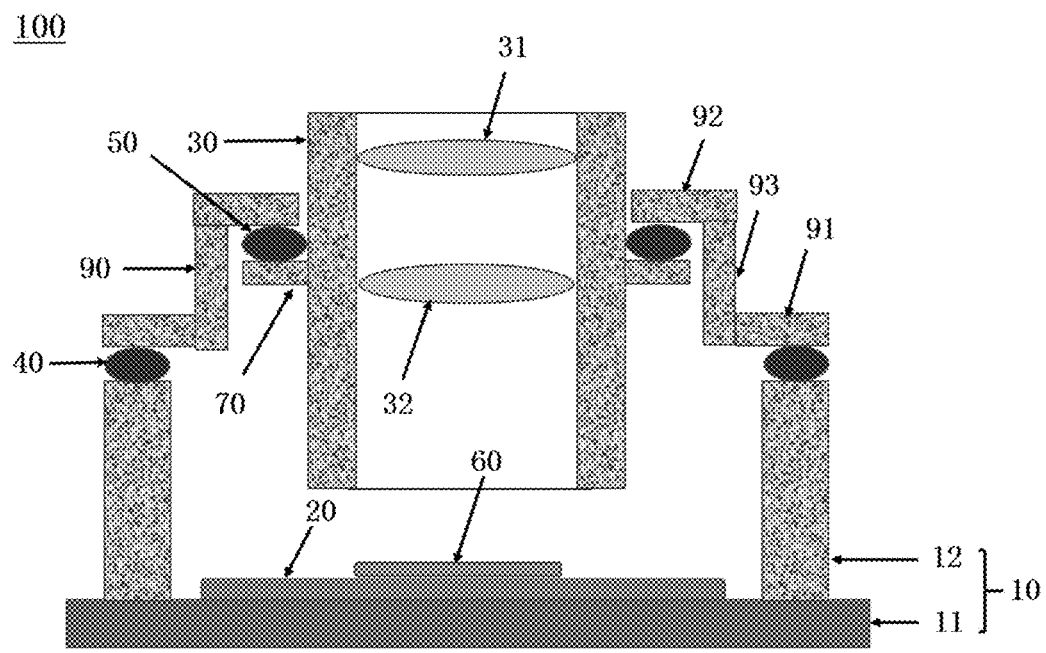
FIG. 18 illustrates a schematic view of a lens module according to an embodiment of the present disclosure.

FIG. 18 is a schematic view of a lens module according to another embodiment of the present disclosure. As shown in FIG. 18, similar to FIG. 10, the lens module 100 includes a substrate 11, a lens holder 12, a PCB 20, a lens unit 30, a connector 90, a first bonding layer 40 and a second bonding layer 50. The substrate 11 and the lens holder 12 together form a base 10. Herein, the lens holder 12 is directly fixed on the substrate 11, and the PCB 20 is disposed on the substrate 11. Alternatively, according to the processing and forming manner, the lens holder 12 and the substrate 11 may be processed integrally, so that both are integrated, and the base 10 including the substrate 11 and the lens holder 12 is obtained by means of integral processing. Specifically, the lens unit 30 has a flange structure 70 located on an outer periphery thereof, and the flange structure 70 is, for example, an annular plate-shaped member and is integrally formed with, or is fixed on, a housing of the lens unit 30. The connector 90 is a lens cap having a first annular portion 91 forming a first end, a second annular portion 92 forming a second end, and a wall portion 93 connecting the first annular portion 91 and the second annular portion 92. The first annular portion 91 is located above the lens holder 12 and is bonded to the lens holder 12 by the first bonding layer 40, and the second annular portion 92 is located above the flange structure 70 and is bonded to the lens unit 30 by the second bonding layer 50.

Figure 19:
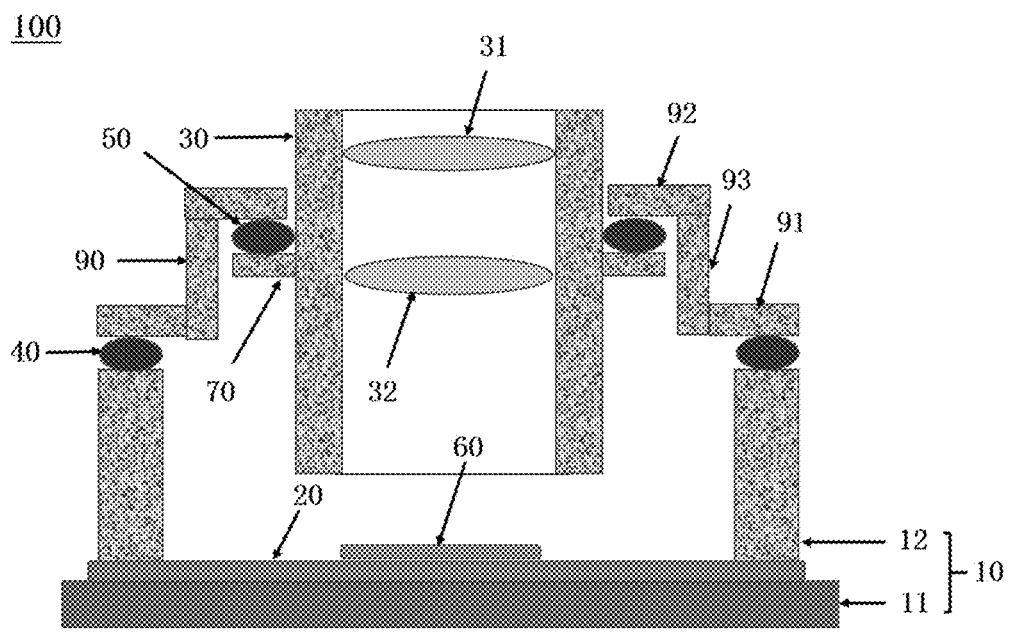
FIG. 19 illustrates a schematic view of a lens module according to another embodiment of the present disclosure.

FIG. 19 is a schematic view of a lens module according to another embodiment of the present disclosure. The structure of the lens module in FIG. 19 is substantially the same as that of the lens module in FIG. 18, and the differences therebetween lie in: the lens holder 12 is directly fixed on the PCB 20, and the PCB 20 is disposed on the substrate 11.

The aforesaid embodiments of the present disclosure provide a lens module, wherein bonding layers with the same material and thickness are disposed at two designated positions in the lens module, and the characteristic that the bonding layers vary uniformly (i.e., swell or shrink simultaneously) in the same environment is utilized, thereby solving the problem in the existing technology that the imaging effect of a module is affected due to the variation in the bonding layer, and improving the resolution and imaging quality of the lens module. Meanwhile, the bonding layers may have a buffering effect on the PCB and the substrate, so as to prolong their service life. Moreover, by means of setting the thicknesses of the bonding layers, the tolerance redundancy can be better ensured between components in the module.

Figure 20:
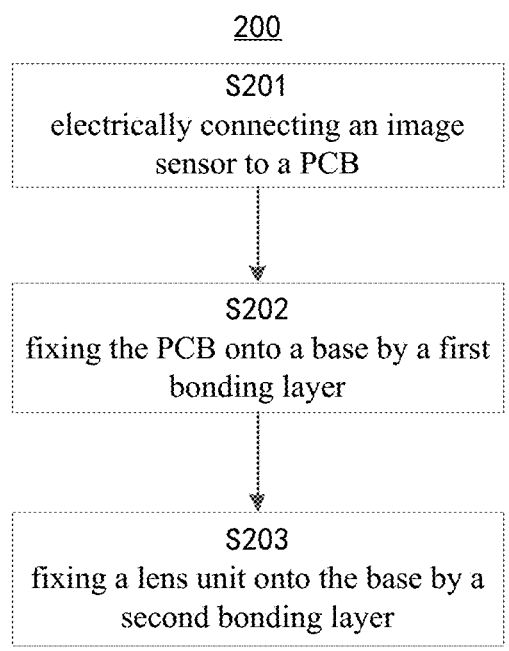
FIG. 20 illustrates a flowchart of a method for assembling a lens module according to an embodiment of the present disclosure.

FIG. 20 illustrates a flowchart of a method for assembling a lens module. According to an embodiment of the present disclosure. The lens module 100 shown in FIGS. 1-5 may be assembled by the assembling method 200. As shown in FIG. 20, the assembling method 200 includes:

Step S201: electrically connecting an image sensor to a PCB.

Step S202: fixing the PCB onto a base by a first bonding layer. Alternatively, a heat-dissipating hot slurry is coated on a lower surface of the PCB, and the first bonding layer is coated on the periphery of the lower surface of the PCB, and the first bonding layer has a thickness of T1 after being cured.

Step S203: fixing a lens unit onto the base by a second bonding layer, wherein the first bonding layer and the second bonding layer have the same thickness and are made of the same material, so that a distance between the image sensor and an optical center of the lens unit remains substantially unchanged when the first bonding layer and the second bonding layer swell or shrink. Specifically, when there is a lens holder, the thickness of the lens holder is matched with the effective back focal length or flange distance of the lens unit, so that a second bonding layer made of the same material as the first bonding layer is selected, and the second bonding layer is fixed onto the lens holder, such that the second bonding layer has a thickness of T2 approximately equal to T1. Therefore, an efficient implementation of the assembling method requires very precise control on the back focal length or flange distance (in the case of a flange structure) of each lens unit, or exact measurement results that can be adapted to the thickness of the lens holder. When the thickness of the lens holder is 0, namely there is no lens holder, a second bonding layer made of the same material as the first bonding layer is selected and disposed on the substrate, then the lens unit is aligned with the substrate, the substrate and the lens unit are bonded together by the second bonding layer, and the second bonding layer has a thickness of T2 approximately equal to T1. Thus, when the first bonding layer is changed, the second bonding layer is also changed by the same amount at the same time, and in the direction of the optical axis of the lens unit, the offset amounts of the PCB and the image sensor are the same as and consistent with that of the lens unit, so that perfect compensation is achieved in an ideal situation.

The above method 200 may be applied to a case where the base includes a substrate and a lens holder, and may also be applied to a case where the base does not include a lens holder. When the base includes a substrate but does not include a lens holder, in the step S202, the first bonding layer is disposed between the substrate and the PCB, and the second bonding layer is disposed between the lens unit and the substrate.

When the base includes a substrate and a lens holder, the method 200 further includes: fixing the lens holder onto the substrate for mounting the lens unit. Herein, the first bonding layer is disposed between the substrate and the PCB, and the second bonding layer is disposed between the lens unit and the lens holder.

According to a preferred embodiment of the present disclosure, the lens has a flange structure located on an outer periphery thereof, and in the step S203, the second bonding layer is disposed between the flange structure and the lens holder.

According to a preferred embodiment of the present disclosure, materials of the first bonding layer and the second bonding layer are selected from a group consisting of a UV adhesive, a thermosetting adhesive, an epoxy resin adhesive, a pressure-sensitive adhesive, a moisture curing adhesive and a light curing adhesive.

Figure 21:
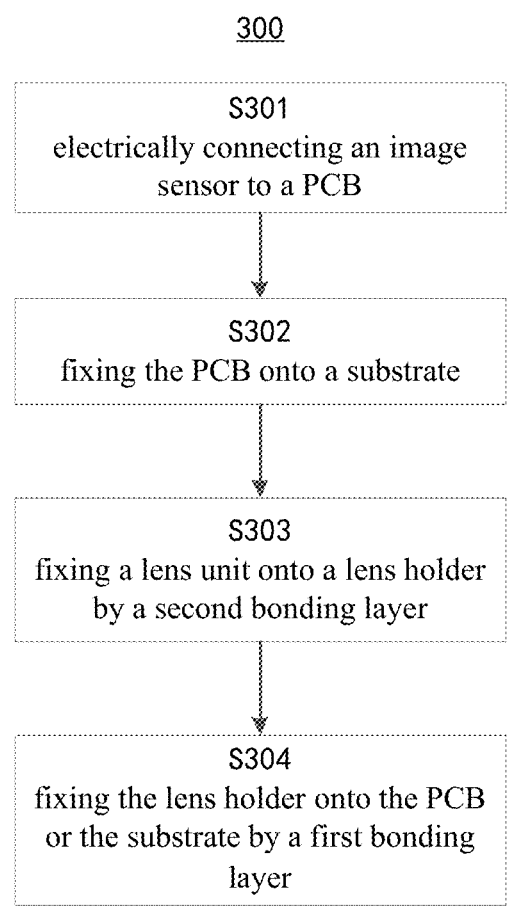
FIG. 21 illustrates a flowchart of a method for assembling a lens module according to another embodiment of the present disclosure.

FIG. 21 illustrates a flowchart of a method for assembling a lens module according to another embodiment of the present disclosure. The lens module 100 shown in FIGS. 6 to 9 may be assembled by the assembling method 300. As shown in FIG. 21, the assembling method 300 includes:

Step S301: electrically connecting an image sensor to a PCB. Alternatively, the PCB therein is obtained by assembling a PCB with an electronic element.

Step S302: fixing the PCB onto a substrate. The PCB is, for example, fixedly mounted in the middle of the substrate.

Step S303: fixing a lens unit onto a lens holder by a second bonding layer. The lens holder is a hollowed cylinder with an L-shaped cross section. The lens holder has a vertical annular wall (forming a vertical portion of the L shape) and an inwardly extending annular portion (forming a horizontal portion of the L shape) at an upper portion or top end of the annular wall, and the annular portion is opposite to an end of the lens unit away from the substrate or a flange structure of the lens unit. Specifically, the end of the lens unit away from the substrate or the flange structure of the lens unit is fixed to the annular portion of the lens holder by the second bonding layer, and a thickness of the second bonding layer is T2.

Step S304: fixing the lens holder onto the PCB or the substrate by a first bonding layer. Alternatively, the first bonding layer is coated on an upper surface of the PCB or the edge of an upper surface of the substrate, and the bottom of the annular wall of the lens holder is fixed onto the PCB or the substrate, and the first bonding layer has a thickness of T1 after being cured. The second bonding layer and the first bonding layer are made of the same material, and the thickness T2 of the second bonding layer is substantially equal to the thickness T1 of the first bonding layer. Thus, when the first bonding layer and the second bonding layer swell or shrink, the amounts of swelling or shrinkage of both are the same, so as to keep the same offset of a distance between the image sensor and an optical center of the lens unit in the direction of the optical axis of the lens unit, so that perfect compensation is achieved in an ideal situation.

Figure 22:
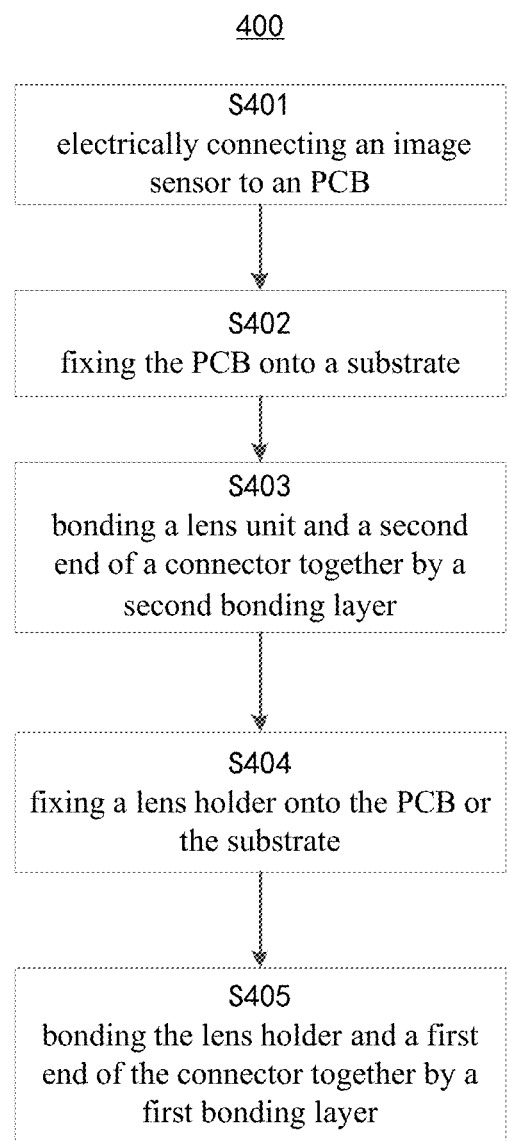
FIG. 22 illustrates a flowchart of a method for assembling a lens module according to still another embodiment of the present disclosure.

FIG. 22 illustrates a flowchart of a method for assembling a lens module according to still another embodiment of the present disclosure. The lens module 100 shown in FIGS. 10 to 19 may be assembled by the assembling method 400. As shown in FIG. 22, the assembling method 400 includes:

Step S401: electrically connecting an image sensor to a PCB. Alternatively, the PCB therein is obtained by assembling a PCB with an electronic element.

Step S402: fixing the PCB onto a substrate. The PCB is, for example, fixedly mounted in the middle of the substrate.

Step S403: bonding the lens unit and a second end of the connector together by a second bonding layer with a thickness of T2.

Step S404: fixing a lens holder onto the substrate or onto the PCB. The lens holder is, for example, fixedly mounted at an edge position of the substrate to enclose the PCB; or the PCB has a large area, and the lens holder may be fixedly mounted at an edge position of the PCB.

Step S405: bonding the lens holder and a first end of the connector together by a first bonding layer. The first bonding layer has a thickness of T1. Herein, the first bonding layer and the second bonding layer have the same thickness and are made of the same material, so that a distance between the image sensor and an optical center of the lens unit remains substantially unchanged when the first bonding layer and the second bonding layer swell or shrink. Specifically, when the connector is a lens cap, a first annular portion of the lens cap is bonded to an upper end of the lens holder by the first bonding layer, wherein gap loose fit exists between the lens cap and the lens unit, a second annular portion is bonded to the upper end of the lens unit by the second bonding layer, and a thickness T2 of the second bonding layer is substantially the same as the thickness T1 of the first bonding layer. When the connector is an annular member, a first end of the annular member is bonded to the lens holder by the first bonding layer, a second end of the annular member is bonded to a flange structure of the lens unit by the second bonding layer, and the thickness T2 of the second bonding layer is made substantially the same as the thickness T1 of the first bonding layer. Thus, when the first bonding layer is changed, the second bonding layer is also changed by the same amount at the same time, and in the direction of the optical axis of the lens unit, the offset amounts of the PCB and the image sensor are the same as and consistent with that of the lens unit, so that perfect compensation is achieved in an ideal situation. Additionally, assembly of the lens module may also be made more flexible by controlling the deviation of the optical/mechanical axis and changes in the FEL.

According to a preferred embodiment of the present disclosure, the connector is a lens cap with a first annular portion forming a first end, a second annular portion forming a second end, and a wall portion connecting the first annular portion and the second annular portion, the first annular portion located above the lens holder and bonded in step S404 to the lens holder by the first bonding layer, and the second annular portion located above the lens unit and bonded in step S403 to the lens unit by the second bonding layer.

According to a preferred embodiment of the present disclosure, the connector is an annular member that is a flat member with a hollowed central portion, an outer periphery of a lower surface of the annular member forming a first end, and an inner periphery of the lower surface of the annular member forming a second end; the lens unit has a flange structure located on an outer periphery thereof. In step S404, the first bonding layer bonds the first end of the annular member and the lens holder together, and in step S405, the second bonding layer bonds the flange structure and the second end of the annular member together.

According to a preferred embodiment of the present disclosure, as shown in FIG. 16, the connector is an annular member that is a flat member with a hollowed central portion, an outer periphery of an upper surface of the annular member forming a first end, and an inner periphery of the upper surface of the annular member forming a second end; the lens unit has a flange structure located on an outer periphery thereof, and the lens holder has a vertical annular wall and an inwardly extending annular portion at an upper portion or top end of the annular wall. In step S404, the first bonding layer bonds the first end of the annular member and the annular portion of the lens holder together, and in step S405, the second bonding layer bonds the flange structure and the second end of the annular member together.

According to a preferred embodiment of the present disclosure, materials of the first bonding layer and the second bonding layer are selected from a group consisting of a UV adhesive, a thermosetting adhesive, an epoxy resin adhesive, a pressure-sensitive adhesive, a moisture curing adhesive and a light curing adhesive.

It should be noted finally that the contents described above are only preferred embodiments of the present disclosure, and are not used to limit the present disclosure. Although the detailed description of the present disclosure has been provided with reference to the foregoing embodiments, those skilled in the art may still make modifications to the technical solution as recited in each of the foregoing embodiments, or make equivalent replacements for some of the technical features therein. Any modification, equivalent replacement, or improvement, etc., made within the spirit and principles of the present disclosure, should be included in the protection scope of the present disclosure.

We claim:

1. A lens module, comprising:
   a substrate;
   a lens holder fixed on the substrate;
   a PCB disposed on the substrate;
   a lens unit comprising one or more lenses;
   a first bonding layer disposed between the lens holder and the substrate;
   a second bonding layer disposed between the lens unit and the lens holder; and
   an image sensor disposed on the PCB,
   wherein the first bonding layer and the second bonding layer have substantially a same thickness and are made of a same material, such that a distance between the image sensor and an optical center of the lens unit remains substantially unchanged in a case where the first bonding layer and the second bonding layer swell or shrink, and
   the lens holder is a hollowed cylinder with an L-shaped cross section.

2. The lens module according to claim 1, wherein the lens unit has a flange structure located on an outer periphery thereof, and the second bonding layer is disposed between the flange structure and the lens holder.

3. A lens module, comprising:
   a substrate;
   a PCB disposed on the substrate;
   a lens holder fixed on the PCB or the substrate;
   a lens unit comprising one or more lenses;
   a connector through which the lens unit is connected to the lens holder;
   a first bonding layer disposed between the lens holder and a first end of the connector;
   a second bonding layer disposed between the lens unit and a second end of the connector; and
   an image sensor disposed on the PCB,
   wherein the first bonding layer and the second bonding layer have substantially the same thickness and are made of the same material, such that a distance between the image sensor and an optical center of the lens unit remains substantially unchanged in a case where the first bonding layer and the second bonding layer swell or shrink, and
   the connector has a first annular portion forming the first end, a second annular portion forming the second end, and a wall portion connecting the first annular portion and the second annular portion, or the connector is a flat member with a hollowed central portion.

4. The lens module according to claim 3, wherein the connector is a lens cap having the first annular portion, the second annular portion, and the wall portion, the first annular portion located above the lens holder and bonded to the lens holder by the first bonding layer, and the second annular portion located above the lens unit and bonded to the lens unit by the second bonding layer, wherein the lens holder and the substrate are integrally processable.

5. The lens module according to claim 3, wherein the connector is a lens cap having the first annular portion the second annular portion, and the wall portion; the lens unit has a flange structure located on an outer periphery thereof; the first annular portion is located above the lens holder and is bonded to the lens holder by the first bonding layer, and the second annular portion is located above the flange structure and is bonded to the flange structure by the second bonding layer, wherein the lens holder and the substrate are integrally processable.

6. The lens module according to claim 3, wherein an outer periphery of an upper surface or a lower surface of the flat member forming the first end, and an inner periphery of the upper surface or the lower surface of the flat member forming the second end; the lens unit has a flange structure located on an outer periphery thereof, the first bonding layer bonds the first end of the flat member and the lens holder together, and the second bonding layer bonds the flange structure and the second end of the flat member together, wherein the lens holder and the substrate are integrated.

7. The lens module according to claim 1, wherein materials of the first bonding layer and the second bonding layer are selected from a group consisting of a UV adhesive, a thermosetting adhesive, an epoxy resin adhesive, a pressure-sensitive adhesive, a moisture curing adhesive and a light curing adhesive.

8. The lens module according to claim 1, further comprising a heat-dissipating hot slurry located between the base and the PCB.

9. The lens module according to claim 3, wherein materials of the first bonding layer and the second bonding layer are selected from a group consisting of a UV adhesive, a thermosetting adhesive, an epoxy resin adhesive, a pressure-sensitive adhesive, a moisture curing adhesive and a light curing adhesive.

10. The lens module according to claim 3, further comprising a heat-dissipating hot slurry located between the base and the PCB.

* * * * *